Jan. 5, 1926.

F. OSMERA 1,568,525

FEEDING ATTACHMENT FOR THRASHING MACHINES

Filed Oct. 22, 1924

Inventor
F. Osmera

By Philip W. H. Snell
Attorney

Patented Jan. 5, 1926.

1,568,525

UNITED STATES PATENT OFFICE.

FRANK OSMERA, OF WAUNETA, NEBRASKA.

FEEDING ATTACHMENT FOR THRASHING MACHINES.

Application filed October 22, 1924. Serial No. 745,182.

*To all whom it may concern:*

Be it known that FRANK OSMERA, a citizen of the United States, residing at Wauneta, in the county of Chase and State of Nebraska, has invented certain new and useful Improvements in Feeding Attachments for Thrashing Machines, of which the following is a specification, reference being had therein to the accompanying drawings.

The invention relates to feeding attachments for thrashing machines, and has for its object to provide above the feeding conveyor an auxiliary feeding conveyor which moves in the opposite direction, and prevents large bunches of grain from being fed into the machine by the feeding conveyor, insures a uniform feeding of material, and by providing a steady feed the speed of the thrashing machine will be regular thereby conserving the machine and engine.

A further object is to provide an auxiliary feeding conveyor for a thrashing machine, which conveyor is adjustably mounted on the front end of the thrashing machine frame in relation to the feeder conveyor, and which auxiliary conveyor is driven by a pulley and belt connection with a rotatable part of the thrashing machine. Also to provide the adjusting means concentric with the pulley which drives the belt, thereby allowing the adjustment of auxiliary of the conveyor upwardly or downwardly without interference from the belt.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing;—

Figure 1:
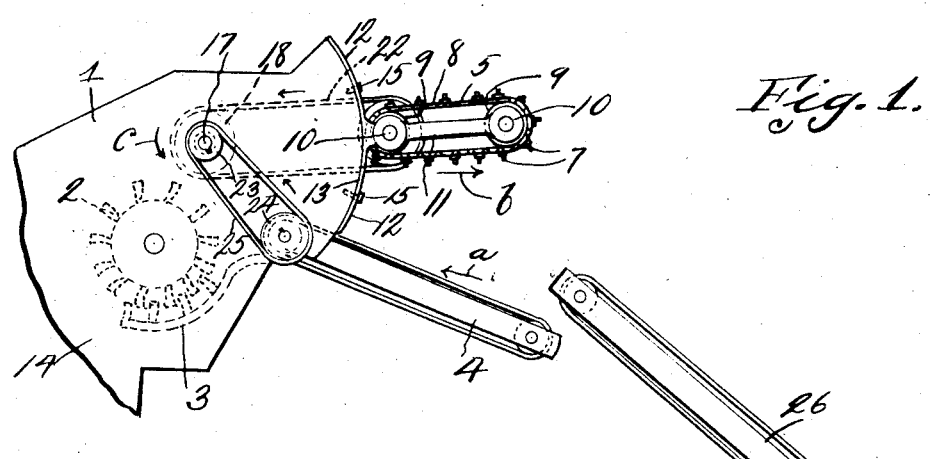
Figure 1 is a side elevation of the feeding end of a conventional form of thrashing machine, showing the feeding device applied thereto.
Figure 2:
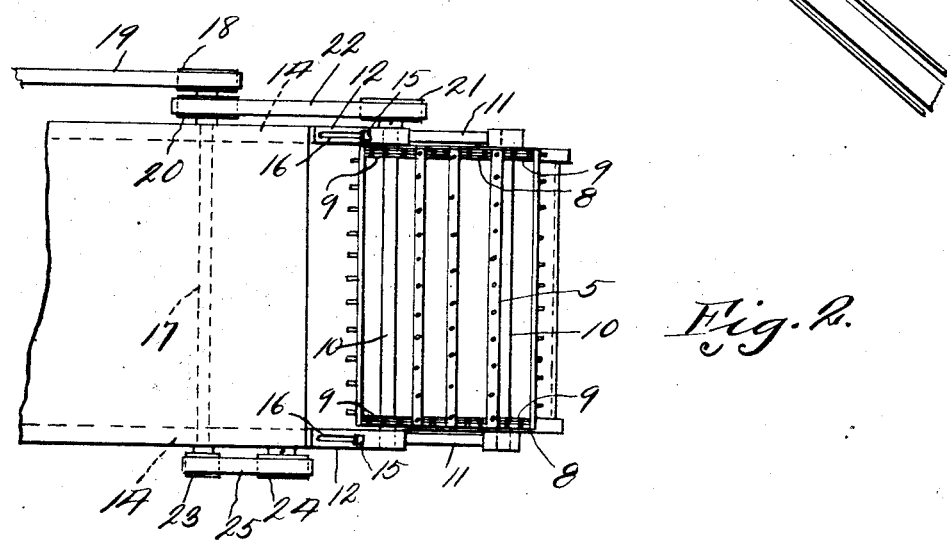
Figure 2 is a top plan view of the feeding device and a portion of the thrashing machine.
Figure 3:
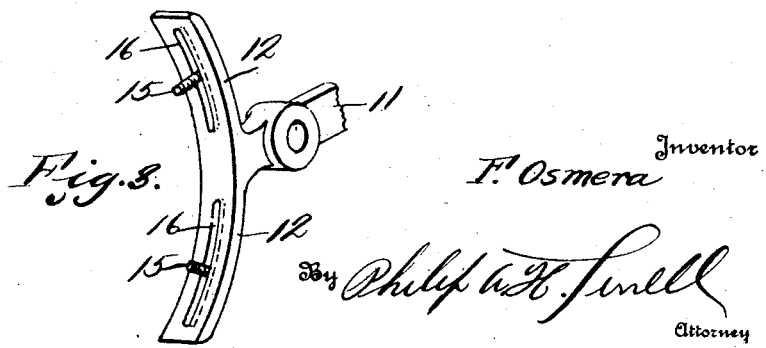
Figure 3 is a detail perspective view of one end of one of the brackets for supporting the auxiliary conveyor.

Referring to the drawing, the numeral 1 designates a portion of a conventional form of thrashing machine, 2 the cylinder therein, and 3 the concave with which the cylinder cooperates. Extending rearwardly and downwardly from the thrashing machine is a conventional form of feeder conveyor 4 of the endless belt type which moves in the direction of the arrow *a* for feeding material into the thrashing machine between the cylinder 2 and concave 3. It has been found where large bunches of grain are fed into the thrashing machine, the strain on the mechanism and engine varies as the bunches are pulled in, and there is not a uniform steady operation of the machine, or steady and even feeding. To obviate this difficulty the endless conveyor 5 is provided, which conveyor moves in the direction of the arrow *b* and in the opposite direction to the direction of movement of the feeding conveyor 4. Conveyor 5 is disposed above the conveyor 4 and is provided with a plurality of downwardly extending fingers 7, which fingers, when an excess amount of grain is fed into the thrashing machine, engage the upper side of the bunches of grain being fed into the thrashing machine, and work the excess amount rearwardly, filling the spaces between the bunches of grain, thereby allowing the conveyor 4 to deliver to the thrashing machine a steady uniform supply of grain, which will insure a uniform operation of the machine without clogging the same and a supply which the power of the thrashing machine engine may easily handle.

The conveyor 5 comprises side chains 8, which extend over sprockets 9 carried by transversely disposed shafts 10, and which shafts have their ends rotatably mounted in bearings of rearwardly extending arms 11. The arms 11 at their inner ends are provided with arcuate shaped arms 12, which engage the rear curved surfaces 13 of the side boards 14 of the thrashing machine. The arms 12 are secured to the side boards 14 by means of bolts 15 which extend through the elongated slots 16 in the arms, therefore it will be seen the conveyor 5 may be adjusted downwardly or upwardly in relation to the conveyor 4 for regulating the amount of material it is desired to be allowed to be fed into the thrashing machine. Extending transversely through the side boards 14 is a drive shaft 17, which shaft is provided with a pulley, over which a belt 19 extends, and which belt may lead to any suitable source of power on the thrashing machine for rotating the pulley and shaft 17 in the direction of the arrow c. Also mounted on the shaft 17 is a pulley 20, and over which pulley and a pulley 21 carried by the inner shaft 10, an endless belt 22 extends, and by means of pulleys 20 and 21 and the belt 22, the endless feeder conveyor 5 is moved in the direction of the arrow b. The curved surfaces 13 on which the device is mounted are concentric with the shaft 17, therefore it will be seen the belt 22 will not interfere with the upward or downward adjustment of the device, and the device may be easily and quickly adjusted by simply loosening the bolts 15, moving the device to the desired position and then tightening the bolts 15.

The feeder conveyor 4 is driven in the usual manner by means of the pulleys 23 and 24, over which the belt 25 extends, and it will be seen that during the adjustment of the auxiliary feeder conveyor 5, it will not be necessary to adjust the feeding mechanism for the feeder conveyor. An extension feeding conveyor 26 is shown for feeding material onto the conveyor 4.

From the above it will be seen that an auxiliary feeding conveyor is provided for thrashing machines, which will insure a steady uniform supply of material to the thrashing machine, and one which may be easily and quickly adjusted in relation to the main feeding conveyor 4 for regulating the amount of material fed in an even uniform stream into the thrashing machine.

The invention having been set forth what is claimed as new and useful is:—

The combination with a thrashing machine having side boards, a conveyor drive shaft extending transversely therethrough, a fixed feeding conveyor, of an auxiliary conveyor above the feeding conveyor and adjustable towards and away from the feeding conveyor, driving connections between the feeding conveyors and the drive shaft, segmentally shaped brackets carried by the auxiliary conveyor, said segmentally shaped brackets engaging curved ends of the side boards concentric with the drive shaft and bolts extending through elongated slots of the segmentally shaped brackets and into the side boards.

In testimony whereof I hereunto affix my signature.

FRANK OSMERA.